United States Patent
Jones et al.

(10) Patent No.: US 9,575,507 B1
(45) Date of Patent: Feb. 21, 2017

(54) CRACK MITIGATION IN AN OPTICALLY TRANSPARENT EXTERIOR OF A PORTABLE ELECTRONIC DEVICE

(71) Applicant: Apple Inc., Cupertino, CA (US)

(72) Inventors: Christopher D. Jones, Cupertino, CA (US); Alexander W. Williams, Cupertino, CA (US); Dale N. Memering, Cupertino, CA (US); Matthew S. Rogers, Cupertino, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 14/843,962

(22) Filed: Sep. 2, 2015

(51) Int. Cl.
*G06F 1/16* (2006.01)

(52) U.S. Cl.
CPC .................. *G06F 1/1626* (2013.01)

(58) Field of Classification Search
CPC .......................................... G02F 2001/133331
See application file for complete search history.

(56) References Cited

U.S. PATENT DOCUMENTS

| | | | | |
|---|---|---|---|---|
| 6,002,102 A | * | 12/1999 | Dulaney | B23K 26/0069 148/525 |
| 6,574,256 B1 | * | 6/2003 | Hofstetter | B82Y 20/00 372/45.01 |
| 6,815,070 B1 | * | 11/2004 | Burkle | B32B 3/04 427/165 |
| 8,947,866 B2 | * | 2/2015 | Jacobs | G02F 1/133308 312/221 |
| 9,166,372 B1 | * | 10/2015 | McLaurin | H01L 21/0243 |
| 9,206,079 B2 | * | 12/2015 | Matsuda | C03C 21/002 |
| 2009/0017263 A1 | * | 1/2009 | Yeates | B22D 19/04 428/167 |
| 2010/0221501 A1 | * | 9/2010 | Chen | B29C 63/0026 428/194 |
| 2010/0285260 A1 | * | 11/2010 | Bookbinder | B32B 3/02 428/45 |
| 2014/0355179 A1 | * | 12/2014 | Little | G06F 1/16 361/679.01 |

* cited by examiner

*Primary Examiner* — Anthony Q Edwards
(74) *Attorney, Agent, or Firm* — Brownstein Hyatt Farber Schreck, LLP

(57) ABSTRACT

A cover glass including a center region and an outer region abutting the center region at an interface. The interface inhibits crack propagation from the outer region to the center region and vice versa. In another embodiment the cover glass may include mitigation voids introduced into the cover glass to inhibit crack propagation. The interface may be formed from the mitigation voids.

20 Claims, 12 Drawing Sheets

US 9,575,507 B1

CRACK MITIGATION IN AN OPTICALLY TRANSPARENT EXTERIOR OF A PORTABLE ELECTRONIC DEVICE

FIELD

Embodiments described herein relate to preventing crack propagation in a material, and more particularly to mitigating cracks in a portion of an exterior of a portable electronic device.

BACKGROUND

Portable electronic device use has become ubiquitous in modern society. Users have come to depend upon these devices to provide information, entertainment and to communicate with other individuals or entities. Thus, devices such as smartphones, laptop computers, tablets, watches and other devices are carried about by users as they proceed through their daily activities.

This ubiquitous use exposes such devices to the possibility of damage near-constantly. Certain portions of a device, such as a cover glass, may be especially susceptible to damage in the form of cracks or other types of breakage. For example, breakage may occur from drops or other impacts on (or to) the cover glass or another part of the portable electronic device. These impact events, as well as other stress and/or strain forces exerted on the cover glass, may result in the generation and propagation of cracks that may deleteriously affect the user's experience and appreciation of the visual display provided by the portable electronic device.

SUMMARY

One embodiment described herein may take the form of a cover glass of an electronic device, comprising: a center region formed of a first material having a first index of refraction; and an outer region formed of a second material having a second index of refraction approximately equal to the first index of refraction; wherein the center region abuts the outer region at an interface; and the interface is operative to stop propagation of a crack between the frame and the pane.

Another embodiment may take the form of a portable electronic device comprising: a housing; a display at least partially within the housing; a cover glass overlying the display and affixed to the housing, the cover glass defining at least one mitigation void therein, the at least one mitigation void part of a pattern within the cover glass operative to inhibit crack propagation.

Yet another embodiment takes the form of a method for making a cover glass for a portable electronic device comprising: forming a pane of a cover glass from sapphire; forming a frame of a cover glass from sapphire; and attaching the pane to the frame at an interface configured to prevent crack propagation between the frame and the pane.

The various embodiments generally include or define a cover glass that is resistant to and inhibits crack propagation. In one embodiment, an outer region and a center region are bonded together at an interface between the two. The outer region and center region may be the same material in one embodiment, while in another embodiment they may be comprised of different materials. In some embodiments, they are formed from different materials having the same (or similar) index of refraction, which makes the two pieces appear as one. The interface between the portions provides a crack inhibiting boundary and may prevent crack propagation across the face of the cover glass on the portable electronic device.

The interface may be implemented with varying interface orientations. In one embodiment the interface is angular while in another embodiment the interface is perpendicular to the face of the cover glass. The bonding of the center region and the outer region may be accomplished by diffusion bonding or other suitable methods.

In another embodiment, micro-voids or other mitigation voids are introduced into the cover glass to inhibit crack propagation. For example, the mitigation voids may be located near a perimeter of the cover glass where most impacts occur and thus where most cracks begin. In one embodiment, the mitigation voids may be made by laser ablation. These mitigation voids may stop or otherwise re-direct the propagation of the crack across the face of the cover glass. In another embodiment, the mitigation voids may be introduced in a pattern within the cover glass to localize any cracks within a portion of the pattern.

DETAILED DESCRIPTION

Figure 1:
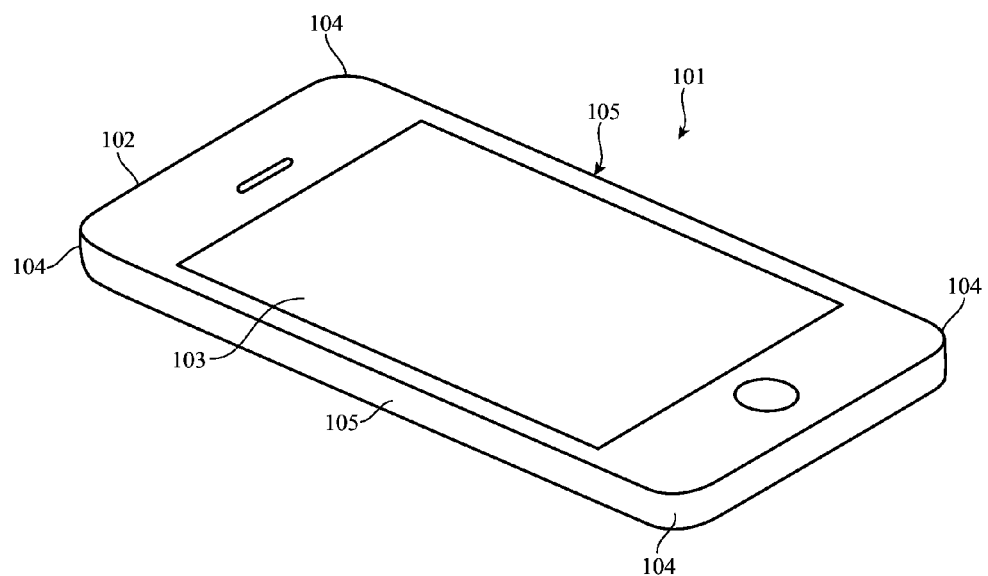
FIG. 1 depicts a portable electronic device.

Reference will now be made in detail to representative embodiments illustrated in the accompanying drawings, wherein like reference numerals denote like structure throughout each of the various figures. It should be understood that the following descriptions are not intended to limit the embodiments to one preferred embodiment. To the contrary, it is intended to cover alternatives, modifications, and equivalents as can be included within the spirit and scope of the described embodiments as defined by the appended claims. These and other embodiments are discussed below with reference to FIGS. 1-16.

Generally, embodiments described herein may relate or take the form of a cover glass or other portion of a housing that is configured to stop, redirect, or reduce propagation of cracks. The cover glass (or portion of the housing) may be optically transparent or translucent, although this is not necessary. In embodiments, an outer region may fully or partially surround or otherwise be adjacent to a center region. The outer region and center region may abut one another at an interface. Cracks originating in the outer region may stop or be redirected by the interface in order to prevent the crack from extending into the center region, and vice versa.

FIG. 1 shows a portable electronic device 101. Portable electronic device 101 includes a housing 102 and a cover glass 103. A display (not shown) is contained within housing 102 and may be visible to a user through cover glass 103. Housing 102 includes corners 104 and side edges 105. Various materials may be used to make cover glass 103, including sapphire, silicon glass, various plastics, and polymers, each of which is often brittle, and thus susceptible to fractures. In addition to impacts directly on cover glass 103, corners 104 and edges 105 of housing 102 are susceptible to impact events which may cause cracking of cover glass 103 adjacent to those corners 104 and edges 105. In particular, cracking may occur if impacts on housing 102 generate stress on cover glass 103 where it is attached to housing 102 around its periphery.

Figure 2:
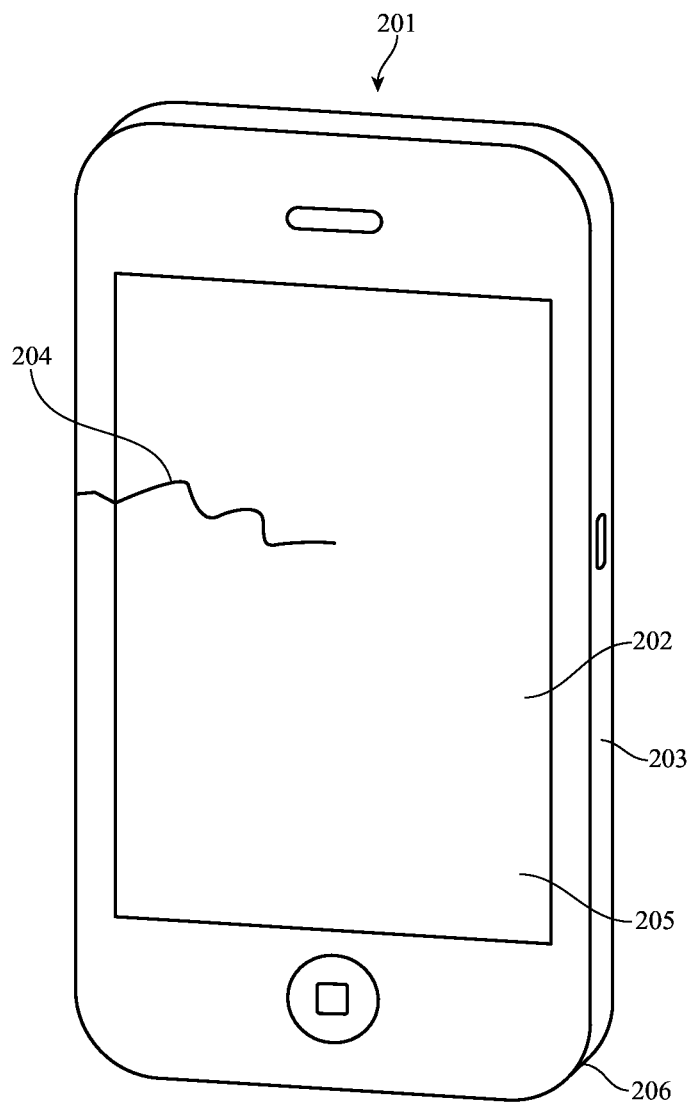
FIG. 2 shows a portable electronic device with a crack in the cover glass.

Referring to FIG. 2, portable electronic device 201 may include a cover glass 202 contained in a housing 203. The cover glass 202 typically includes a top face 205, a bottom face opposite the top face, and at least one side surface or side face connecting the two. The top and bottom faces may be substantially planar and formed by a combination of the center and outer regions, although this is not necessary. In other embodiments, the top face, bottom face, and/or side surface(s) may be non-planar, including forming a curved surface. A crack 204 is shown across the top face 205 of cover glass 202; in some cases the crack 204 may extend entirely through the cover glass 202 to a bottom face opposite the top face. Crack 204 may start adjacent an impact point, such as a direct impact on the top face 205 of cover glass 202 or a corresponding part of a side surface. Crack 204 can propagate across top face 205 of cover glass 202 due to environmental conditions, such as fluctuating temperature, or due to additional mechanical stress, such as flexing of top face 205, which can enable and/or accelerate the propagation of crack 204 through top face 205 and/or the entirety of the cover glass 202.

Figure 3:
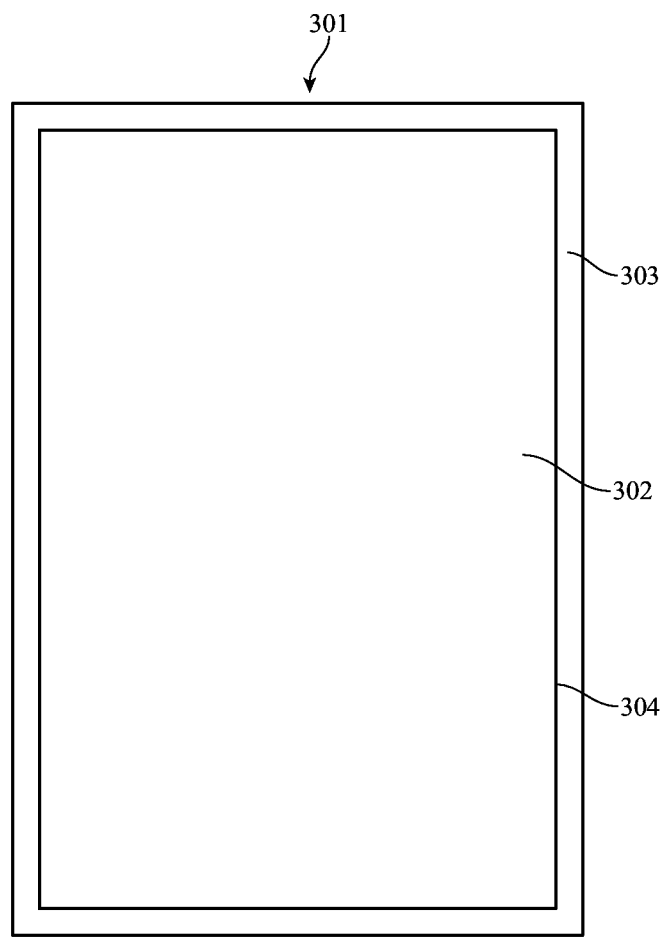
FIG. 3 is a front view of a cover glass with edge frame.

FIG. 3 depicts a front view of one sample cover glass 301 having a center region 302 formed from a substantially optically transparent material and an outer region 303 also of a substantially optically transparent material; the outer region is typically positioned around the periphery of the center region. The sample cover glass is shown as a rectangle but may have any suitable shape including, for example, rounded corners as illustrated in FIGS. 1 and 2. The center region and outer region may be formed in any of a variety of shapes and dimensions. Typically, the center and outer regions contact one another, and are affixed to one another, at an interface. In many embodiments, the center and outer regions may be affixed to one another along an entirety of the interface, while in others they may be affixed to each other only at portions or parts of the interface.

The center region 302 is also referred to herein as a "pane" and the outer region 303 is also referred to herein as a "frame." Further, it should be appreciated that the center region 302 need not be a center of the cover glass 301 or housing portion, just as the outer region 303 need not extend fully or partially around the center region in all embodiments.

In one embodiment, frame 303 and pane 302 may be formed from the same material such as silicon glass, sapphire glass, polymers or other suitable materials. In other embodiments, frame 303 and pane 302 may be formed from different materials. As one example, frame 303 and pane 302 may be made from different materials having approximately the same index of refraction such that the human eye may not discern any break or separation line between the frame and pane, or such separation may be difficult to see. Alternately, one or both of the frame 303 and pane 302 may have one or more coatings to modify the index of refraction of the particular piece in order to more closely match the indices. The frame and pane may have identical thicknesses, or one may be thicker than the other. For example, the frame may be thicker than the pane since many impacts occur at an edge of the frame; by thickening the frame relative to the pane, crack propagation may be less likely to occur in the frame.

In some embodiments, pane 302 may be silicon glass while frame 303 may be formed from sapphire glass, polymers, ceramics and transparent ceramics, or other suitable material. In other embodiments, pane 302 may be made from sapphire glass while frame 303 may be formed from silicon glass or any of various polymers. Either of both of pane 302 and frame 303 may be formed from sapphire having a particular crystallographic plane orientation, such that a particular crystallographic plane (e.g., A-plane, C-plane, M-plane and so on) forms a particular part of the frame and/or pane. For example, frame 303 may have a first plane defining its top surface while pane 302 has a second plane defining its top surface. The crystallographic planes may be the same or different.

Referring again to FIG. 3, pane 302 and adjacent frame 303 meet, abut, and/or are adjacent at an interface 304. Interface 304 alternately may be (or may incorporate or utilize) a bond between pane and frame and may be created by (or may utilize) diffusion bonding, epoxy gluing, brazing, laser bonding, frit bonding, injection molding, extruding, and/or casting of frame 303 directly onto or around pane 302, in order to bond the frame and pane. Interface 304 typically is made as indistinguishable as possible such that a user may view the top face of cover glass without seeing interface 304. A near-seamless interface 304 also enhances the cosmetic appearance of cover glass 301 and thus the overall cosmetic appearance of any associated portable electronic device. Further, any adhesive or the like at or forming the interface 304 may be index-matched (e.g., have the same or similar index of refraction) to one or both of the pane 302 and frame 303 in order to create a seamless or near-seamless appearance.

Figure 4:
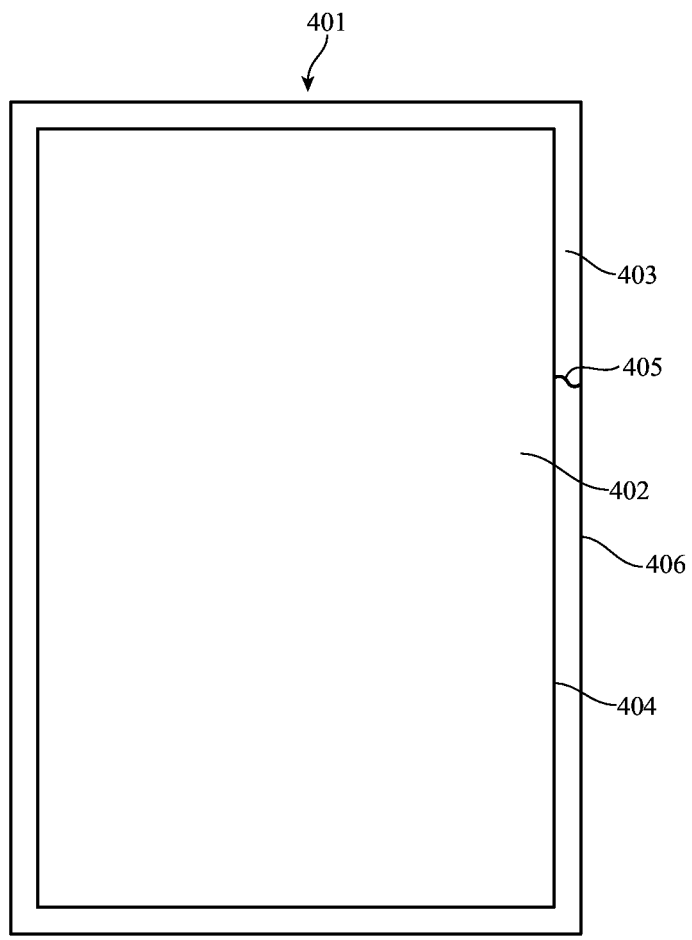
FIG. 4 is a front view of a sample cover glass and frame with a crack in the frame.

FIG. 4 depicts a cover glass 401 having an outer region or frame 403 surrounding the periphery of a center region or pane 402 with an interface 404 therebetween, similar to the cover glass 301 of FIG. 3. Here, however, frame 403 includes a crack 405. The crack 405 may propagate across frame 403 but does not propagate past interface 404 or into pane 402, since the pane 402 and frame 403 are separate pieces. That is, crack 405 in cover glass 401 stops at interface 404 due to the change in materials. Further, the interface 404 generally disperses at least some of the energy of the crack 405. Crack 405 thus may be limited to the frame 403 such that the pane 402 remains undamaged.

Figure 5:
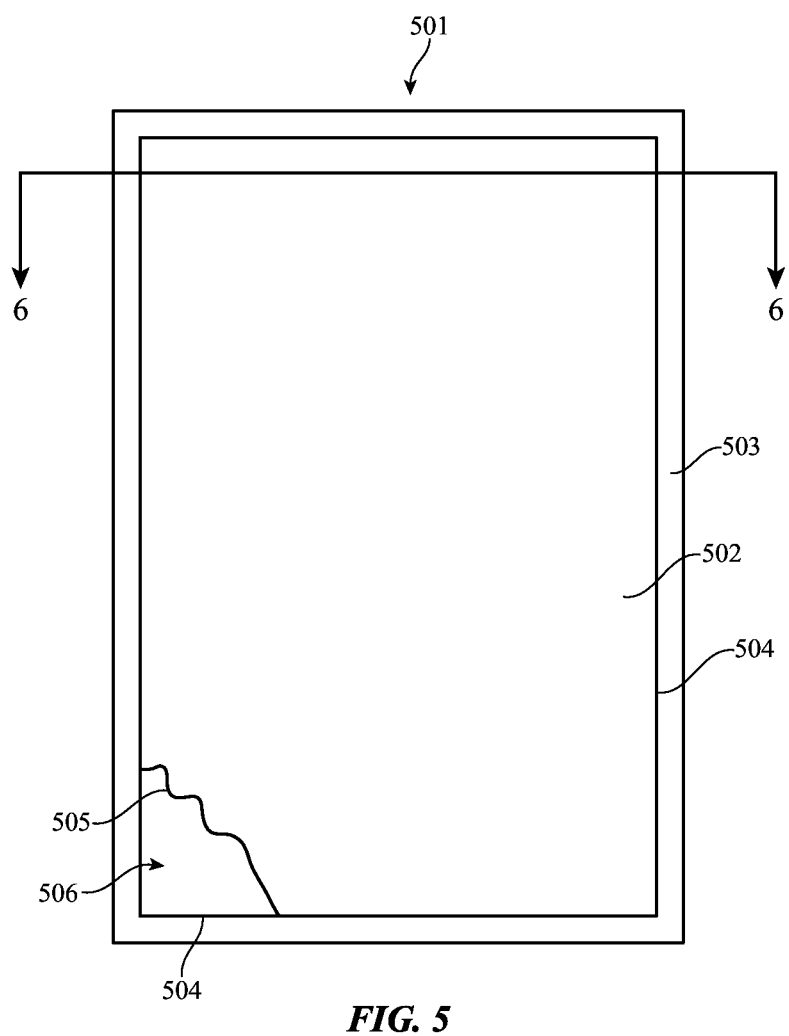
FIG. 5 is a front view of a sample cover glass and frame with a crack in the cover glass.

FIG. 5 shows a front view of a cover glass 501 with an outer region or frame 503 surrounding a center (or inner) region or pane 502 at an interface 504, as with the embodiments of FIGS. 3 and 4. Here, however, pane 502 has a crack 505 as opposed to the crack in frame 403 in FIG. 4. As shown, the crack 505 does not extend into frame 503 but stops at interface 504. Crack 505 in cover glass 501 stops at interface 504 for the same reasons as discussed previously herein. For example, the interface may prevent crack propagation and/or may disperse some energy of the crack rather than passing that energy to the pane from the frame.

The interface between the pane and the frame may be implemented at various angles to provide both manufacturing advantages and strength improvement. For example, in some embodiments, strength of the bond between the pane and frame may be improved by providing an angled interface as will be explained below. In other embodiments, a perpendicular interface may be employed.

Figure 6:
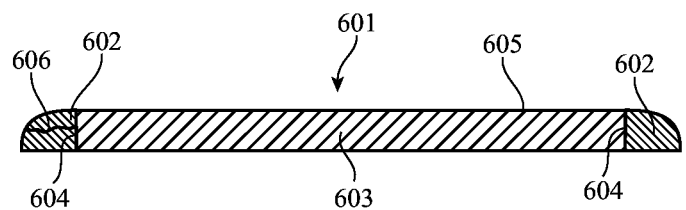
FIG. 6 is a cross-sectional view of one sample cover glass through line 6-6 of FIG. 5, showing one version of an interface.

FIG. 6 illustrates a cross-sectional view of a sample cover glass 601, taken through line 6-6 of FIG. 5 and showing the frame 602 attached to the pane 603 at interface 604. In this embodiment, interface 604 is approximately perpendicular to the top face 605 of pane 603. Top face 605 is the face seen by a user of a portable electronic device, while a bottom face of the cover glass is typically the surface of the glass within the associated electronic device and/or opposite top face. A side surface or side face may extend from the top face to the bottom face. In many embodiments, the outer region/frame and center region/pane cooperate to form the top and bottom faces; the side surface(s) may be formed solely by the frame or may be formed by both the frame and center region. Frame 602 is rounded at the portion adjacent top face 605 but may be straight or angled in other embodiments. Rounded corners may be less prone to cracking or chipping in certain embodiments and/or uses.

Figure 7:
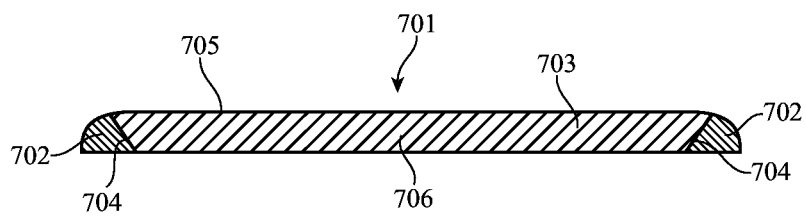
FIG. 7 is a cross-sectional view of edge of another sample cover glass through line 6-6 of FIG. 5, showing another version of an interface.

FIG. 7 illustrates a cross-sectional view of another sample cover glass 701 and taken through line 6-6 of FIG. 5, showing the frame 702 attached to pane 703 at angular interface 704. In this embodiment, interface 704 is a non-right angle with respect to the top face 705 of pane 703. This non-right angle may provide a longer interface and thus more bond surface. Further, the non-right angle may help in resisting disconnection of pane and frame due to an impact. Additionally, the non-right angle of the interface 704 may improve the cosmetic appearance of the interface.

In this embodiment, angular interface 704 is shown extending inwardly from the top face 705 of pane 703 to the bottom face 706, which is adjacent to a display when the cover glass 701 is used in an electronic device. As with the embodiment of FIG. 6, frame 702 is shown with rounded corners at the portion adjacent face 705.

Figure 8:
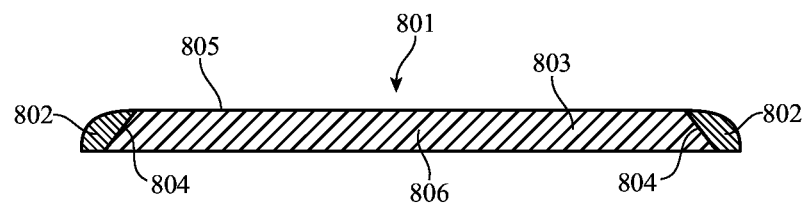
FIG. 8 is a cross-sectional view of edge of still another sample cover glass through line 6-6 of FIG. 5, showing another version of an interface.

FIG. 8 illustrates a cross-sectional view of yet another sample cover glass 801, again taken through line 6-6 of FIG. 5 and showing the frame 802 attached to pane 803 at an angular (e.g., non-right) interface 804. In this embodiment, angular interface 804 extends outwardly from top face 805 toward bottom face 806, which may be adjacent or above a display when the cover glass 801 is used as part of an electronic device.

The strength of the interface between the frame 802 and pane 803 enhances the structural integrity of the cover glass and may stop crack propagation between a pane and frame.

For example, the interface may dissipate some or all energy that would otherwise propagate a crack between frame and pane (or vice versa) by redirecting that energy along the interface. The bond between frame and pane may be easier to break than the material of either the frame or pane, for example. Likewise, the interface may permit the frame and pane to slip with respect to one another, thereby absorbing or dissipating energy that may otherwise cause or extend a crack or other discontinuity.

Figure 9:
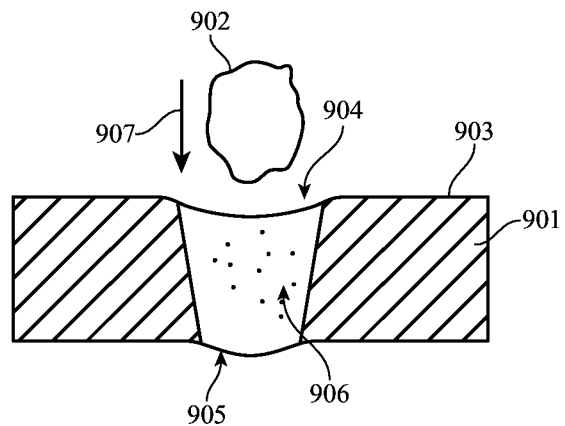
FIG. 9 is a cross-sectional view of a portion of a cover glass, showing an object and the cover glass after impact of the object on the cover glass.

Referring to FIG. 9, a cross-sectional view of a partial cover glass 901 illustrates the effect of an impact on top face 903 from an object 902 which impacts the surface of the portable electronic device. (In the figure, the object is shown spaced apart from the cover glass to more clearly illustrate the impact effects.) The impact as shown is due to the object hitting the cover glass from the direction shown by arrow 907. Similar damage may be caused by the portable electronic device being dropped and the cover glass impacting an object when it hits the ground. When object 902 impacts top face 903 of cover glass 901, top face 903 is deformed at 904 and bottom face 905 also deformed. The glass material 906 between surfaces 904 and 905 may be crushed and pulverized between surfaces 904 and 905 or otherwise damaged. In some situations, only a portion of the glass material adjacent surface 904 may be damaged.

Figure 10:
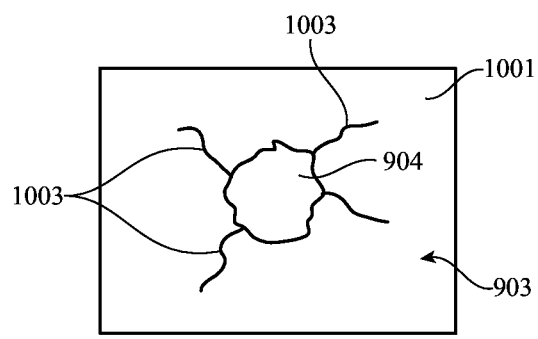
FIG. 10 is a top view of the cover glass of FIG. 9, showing damage resulting from the impact.

Referring to FIG. 10, a top view of a cover glass 1001 is shown and illustrates dame resulting from impact of a rock 902, similar to the impact in FIG. 9. The impact area 1002 is pulverized or otherwise damaged adjacent surface 904 such that cracks 1003 emanate from the impact area and may propagate across the surface of, and/or through, cover glass 1001.

Figure 11:
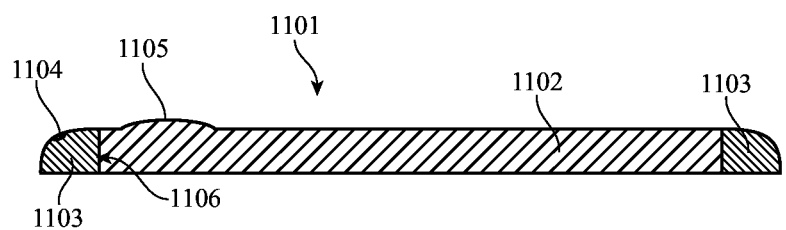
FIG. 11 is a side cross-sectional view of a cover glass illustrating the effect of an impact on a frame of the cover glass.

FIG. 11 is a cross-sectional view of a cover glass 1101 showing a deformation resulting from an impact, such as described with respect to FIGS. 9 and 10. The impact may occur on pane 1102 or frame 1103 of cover glass 1101. If the impact occurs on frame 1103 such as for example, at point 1104, a slight bulge in pane may be induced at point 1105 due to the stress exerted by impact 1104. This bulge 1105 may result in a stress fracture in the area of 1105 and, ultimately, crack propagation in pane 1102.

In order to alleviate the stress induced at point 1105, interface 1106 may permit the frame and/or pane to slip with respect to one another. While interfaces, in some embodiments, have been described above as utilizing a bonding technique such as epoxy glue, diffusion bonding, brazing, casting or other such attachment systems, in some embodiments, interface 1106 could utilize a pliable adhesive between the center region and inner region (e.g., pane 1102 and frame 1103). In such embodiments, interface 1106 could be allowed to slip or move to relieve tension between frame 1103 and pane 1102 of the cover glass 1101, such as in response to a sufficient force exerted on either frame or pane. In some embodiments, the frame 1103 may be allowed to pull away from the pane 1102, thus inhibiting or confining crack propagation to either the frame 1103 or the pane 1102 depending upon where the crack was initiated. In other embodiments, the frame and pane may move laterally relative to one another in one or more dimensions. In effect, an adhesive failure could be engineered to occur to prevent the impact on one portion of cover glass 1101 such as frame 1103 from inducing a crack in pane 1102.

In other embodiments, frame 1103 could be made from a compliant material so that a crack would either not be initiated in the frame 1103 or propagation would be contained within the frame. In these embodiments, pane 1102 may still be a brittle glass material but the frames 1103 could be made from a compliant material. In other embodiments, panes 1102 could be made from a compliant material and frame could be made from a brittle material while in other embodiments, both panes 1102 and frames 1103 could be made from a compliant material to reduce crack propagation in either or both of pane and frames of the cover glass.

Figure 12:
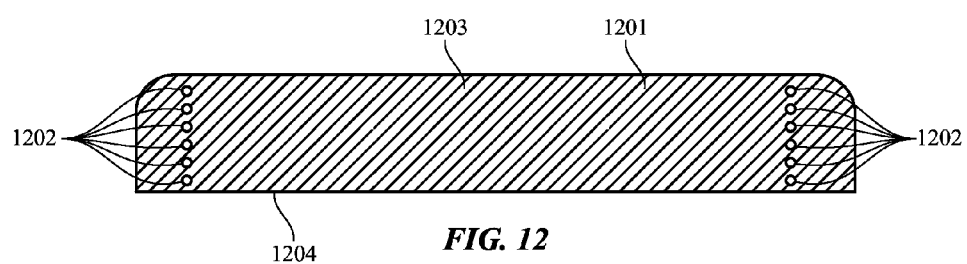
FIG. 12 is a side cross-sectional view of a cover glass including mitigation voids in the material structure.

Referring to FIG. 12, a cross-sectional view of a cover glass 1201 is shown with one or more mitigation voids 1202 introduced therein. The mitigation voids 1202 may inhibit crack propagation throughout the cover glass, as described in more detail below with respect to FIG. 13.

In this embodiment, cover glass 1201 may be subjected to laser beam ablation to vaporize material to form one or more voids 1202 or otherwise introduce voids into cover glass 1201. While laser ablation is used in one embodiment, it should be understood that any suitable method may be used for introducing mitigation voids 1202 into cover glass 1201. For example, multiple layers may be used to form the cover glass; a portion of each void may be formed on mating surfaces of each layer, such that the voids are formed when the layers are placed next to one another and/or bonded to one another.

In some embodiments, mitigation voids 1202 may be micro-voids introduced into the material. In this embodiment, mitigation voids 1202 are introduced in a broken line approximately perpendicular to face 1203 of cover glass 1201 (e.g., extending from a top face to a bottom face of the cover glass). However, in other embodiments, other patterns of mitigation voids 1202 may be used such as arcuate, circular or other geometric patterns, including arrays of geometric shapes (e.g., squares, circles, and the like). These introduced mitigation voids typically are small (on the order of no more than approximately 100 microns in any given dimension) so as to be substantially invisible to a viewer, although other embodiments may use larger mitigation voids that may be visible to the naked eye, albeit difficult to see.

In some embodiments the mitigation voids 1202 may form the interface between the frame and pane; the mitigation voids may be generally aligned in a pattern that mimics the afore-described interface but does not necessarily totally separate the frame and pane. In other words, in this embodiment the frame and pane may be formed from a substantially solid or unitary material and the interface may be formed from a set or series of one or more mitigation voids 1202.

Figure 13:
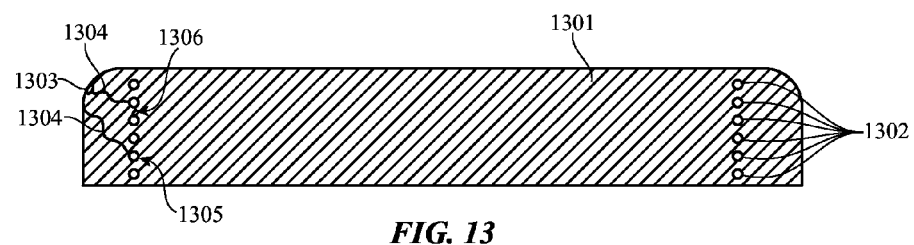
FIG. 13 is a cross-sectional view similar to FIG. 12 showing crack propagation across an mitigation void pattern.

Referring to FIG. 13, a cross-sectional view similar to FIG. 12 is shown with mitigation voids 1302 illustrated in a cover glass 1301. In this embodiment, an impact has occurred at point 1303, which has initiated cracks 1304 in cover glass 1301. Cracks 1304 propagate through cover glass 1301 but, upon encountering mitigation voids 1302, cracks 1304 may be either stopped at point 1305 or redirected in another direction, for example to another mitigation void as shown by second crack 1306. In either instance, cracks 1304 are prevented from propagating further into cover glass 1301. Mitigation voids 1302 may be void spaces or they may be partially melted spaces in cover glass material 1301. The crystalline structure of the cover glass material has been altered by laser ablation or other means to create mitigation voids 1302. These mitigation voids may expand or otherwise absorb energy that might otherwise propagate a crack, thereby preventing or inhibiting one or more cracks from spreading through the structure of cover glass 1301.

Figure 14A:
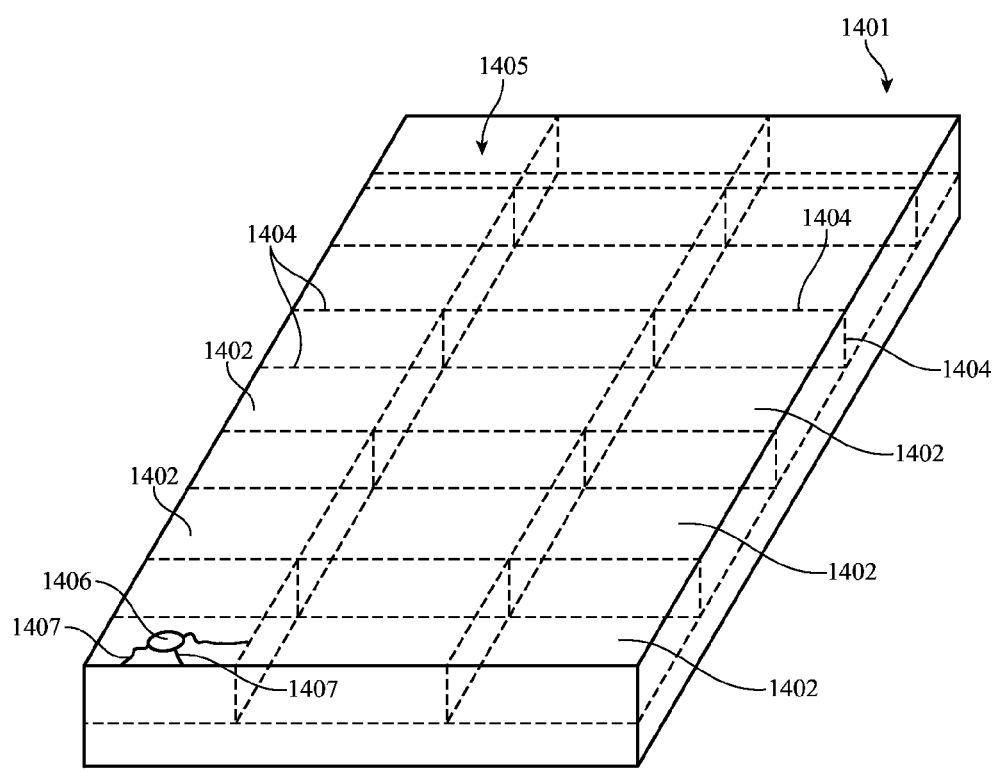
FIG. 14A shows a cover glass including mitigation voids forming a pattern in the cover glass.

Referring to FIG. 14A, in another embodiment, a cover glass 1401 is shown which may include localized regions 1402 created by a mitigation void pattern throughout cover glass 1401. That is, mitigation voids 1404 are introduced into cover glass 1401 as discussed above but in this embodiment, mitigation voids 1404 are in a pattern adjacent the entire face 1405 of cover glass 1401. The pattern defines a set of localized regions 1402. Any impact at a point on face 1405 of cover glass 1401 which generates cracks in cover glass 1401 may be confined within the localized region 1402 of impact, since the mitigation voids may redirect or stop crack propagation.

Figure 14B:
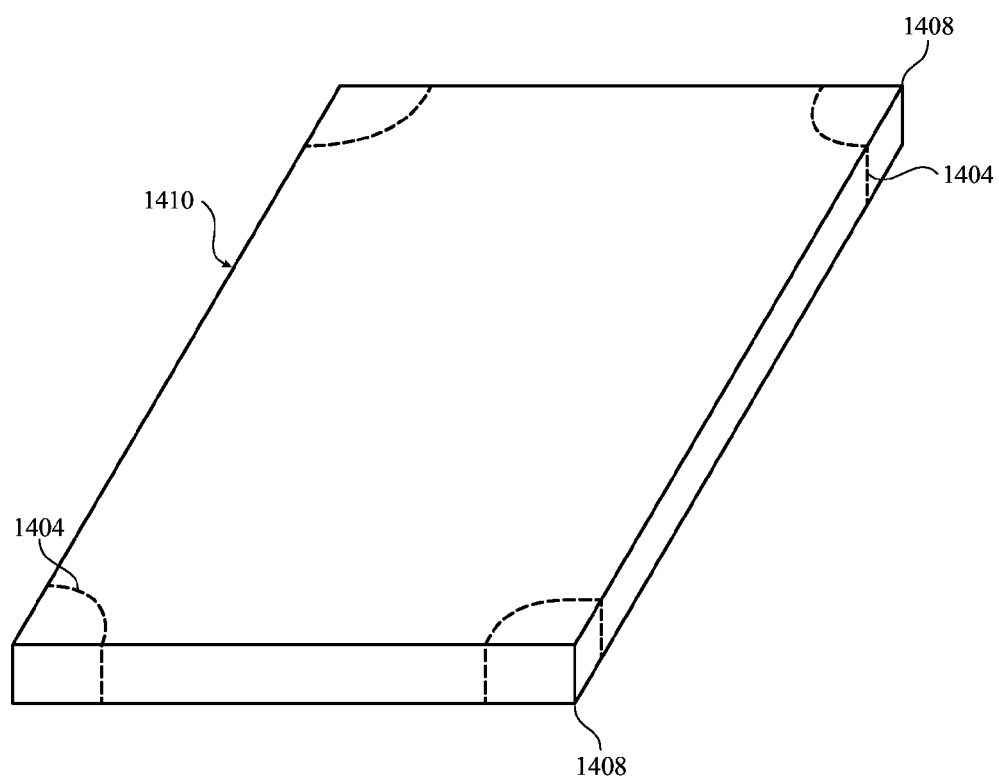
FIG. 14B shows a cover glass having a second sample pattern formed from mitigation voids.

FIG. 14B illustrates another sample cover glass 1410, or other portion of an electronic device housing, having localized corner areas 1408. The corner areas 1408 are bounded by mitigation voids 1404, similar to the cover glass of FIG. 14A. Here, however, the mitigation voids 1404 set off areas 1408 around each corner, rather than defining a grid-like pattern. Insofar as many electronic devices are especially susceptible to cracking at or near the corners, the illustrated pattern of mitigation voids 1404 may prevent expansion of cracks, or redirect cracks, away from a portion of the cover glass 1410 covering, overlying or otherwise adjacent a visible display. Further, the relatively minimal pattern of mitigation voids shown in FIG. 14B (as compared to that of FIG. 14A) may reduce any visual impact on the cover glass 1410 as a whole and particularly on display regions of the cover glass. Further, it should be appreciated that the pattern shown in FIG. 14B need not be formed by mitigation voids 1404 but instead may represent a number of interfaces between different outer regions and a center region, as generally described elsewhere herein.

For example, in this embodiment, mitigation voids 1404 define a block pattern throughout the upper portion of cover glass 1401 adjacent face 1405. Thus, cracks 1407 generated by an impact occurring at point 1406 on cover glass face 1405 will be confined by mitigation voids 1404 to a particular block in which the impact occurred. Mitigation voids 1404 are made small enough so as to not interfere with a user's view of a display 1408 through cover glass 1401. For example, in one embodiment mitigation voids 1404 may each be about 100 microns in diameter or largest dimension (if the voids are not circular). The overall pattern of voids may define or separate various portions 1402 of cover glass 1401. The propagation of cracks 1407 is thus inhibited across the face 1405 of cover glass 1401, thereby enhancing the user experience and satisfaction in viewing displays on a portable electronic device.

Figure 15:
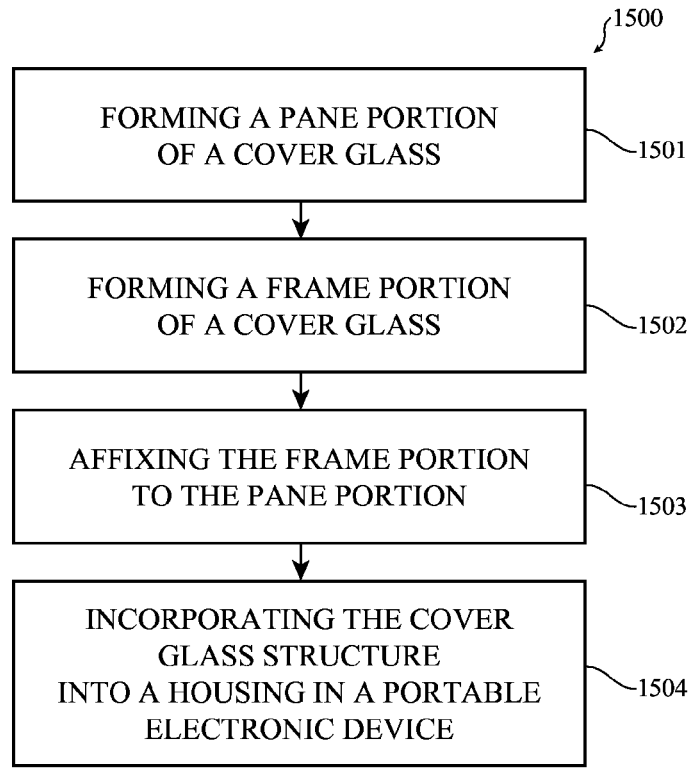
FIG. 15 is a flow diagram of one method for making a cover glass.

Referring to FIG. 15, a flow diagram of one embodiment 1500 of a method for making a cover glass for a portable electronic device is disclosed. In operation 1501, a pane of a cover glass is formed. In operation 1502, a frame of a cover glass is formed and in operation 1503, the frame is affixed to the pane. The affixation operation 1503 may be accomplished by using an adhesive, laser bonding, casting the frame directly on the pane, or other suitable methods. In operation 1504, the resulting cover glass structure may be incorporated into a housing of a portable electronic device and adjacent or overlying a display.

Figure 16:
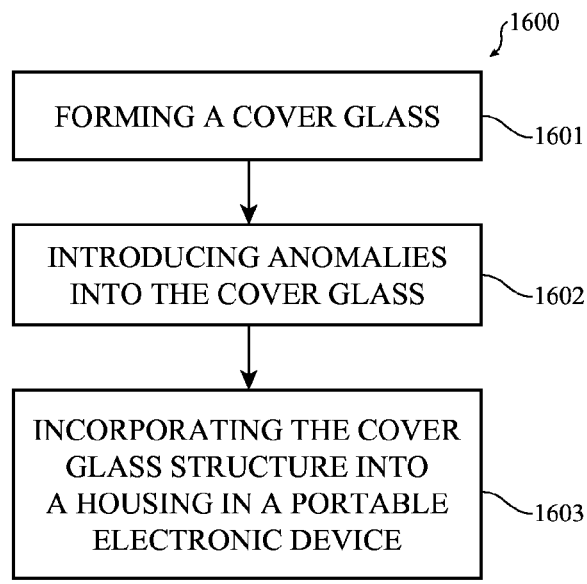
FIG. 16 is a flow diagram of an alternate method for making a cover glass.

Referring to FIG. 16, an alternate embodiment 1600 of a method for making a cover glass for a portable electronic device is disclosed. In operation 1601, a cover glass is formed. In operation 1602, mitigation voids may be introduced into the cover glass by laser ablation or other suitable means for crystallizing or eliminating portions of the cover glass material. In one embodiment, the mitigation voids are introduced in a row substantially perpendicular to the face of the cover glass around the periphery of the cover glass. In another embodiment, the mitigation voids are introduced into the cover glass in a pattern within and below the entire surface adjacent to the face of the cover glass. In operation 1603, the resulting cover glass structure may be incorporated into a housing of a portable electronic device and positioned adjacent or overlying a display.

While various materials have been disclosed for the frame and panes of a cover glass, it should be understood that the selection of these materials may be altered from the described embodiments without departing from the scope of the claims. The response to temperatures of some materials may change over time as they age and some materials may also change their modulus of elasticity over time. Other material property changes may be accounted for in selecting the most appropriate materials for the various layer embodiments.

Likewise, embodiments have been discussed herein with respect to a cover glass of an electronic device. It should be appreciated that the various embodiments, methods and apparatuses may be used in different applications or as different structures. For example, a window or lens of a camera may be formed in accordance with the teachings herein, as may an appliance, a window for a dwelling or vehicle, an input mechanism of an electronic device, and so on.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not target to be exhaustive or to limit the embodiments to the precise forms disclosed. It will be apparent to one of ordinary skill in the art that many modifications and variations are possible in view of the above teachings.

We claim:

1. A cover glass of an electronic device, comprising:
   a center region formed of a first material having a first index of refraction; and
   an outer region formed of a second material having a second index of refraction approximately equal to the first index of refraction; wherein
   the center region abuts the outer region at an interface; and
   the interface is operative to stop propagation of a crack either from the outer region to the inner region, or from the inner region to the outer region.

2. The electronic device of claim 1, wherein:
   the first and second materials are the same; and
   the first and second materials are optically transparent.

3. The electronic device of claim 1, wherein the first and second materials are each selected from glass, sapphire, ceramic, or polymer.

4. The electronic device of claim 1, wherein the interface comprises a set of mitigation voids in the cover glass.

5. The electronic device of claim 1, wherein the outer region is bonded to the center region by one of adhesive, diffusion bonding, direct casting, injection molding, or brazing.

6. The electronic device of claim 1, wherein the interface permits movement of the outer region relative to the center region when a force is exerted on at least one of the outer and center regions.

7. The electronic device of claim 6, wherein the outer region is formed from a compliant material.

8. The electronic device of claim 1, wherein:
   the outer and center regions cooperatively form a face of the cover glass; and
   the interface is perpendicular to the face.

9. The electronic device of claim 1, wherein:
   the outer and center regions cooperatively form a face of the cover glass; and
   the interface extends at a non-right angle from the face.

10. A portable electronic device comprising:
    a housing;
    a display at least partially within the housing;
    a cover glass overlying the display and affixed to the housing, the cover glass defining at least one mitigation void therein, the at least one mitigation void part of a pattern within the cover glass operative to inhibit crack propagation.

11. The portable electronic device of claim 10, wherein the pattern is a broken line extending between a top face and a bottom face of the cover glass.

12. The portable electronic device of claim 10, wherein the at least one mitigation void is operative to redirect a crack propagating through the cover glass.

13. The portable electronic device of claim 10, wherein the at least one mitigation void is no greater than 100 microns in any dimension.

14. The portable electronic device of claim 10, wherein the cover glass is formed from sapphire.

15. A method for making a cover glass for a portable electronic device, comprising:
    forming a pane of a cover glass from sapphire;
    forming a frame of a cover glass from sapphire; and
    arranging the pane and the frame to abut at an interface configured to permit the frame and the pane to move with respect to one another under an induced stress.

16. The method of claim 15, wherein the frame and pane are formed from a unitary cover glass.

17. The method of claim 16, wherein the operations of forming the pane and forming the frame are done at the same time by creating a set of mitigation voids in the sapphire, thereby defining the pane and the frame.

18. The method of claim 15, wherein:
    the pane moves with respect to the frame by slipping; and
    the induced stress results from an impact.

19. The method of claim 15, wherein the frame is thicker than the pane.

20. The method of claim 15, wherein the interface comprises at least one mitigation void.

* * * * *